United States Patent [19]
Crawford et al.

[11] 3,827,191
[45] Aug. 6, 1974

[54] CAM CONTROLLED SURFACE FORMING MACHINE

[75] Inventors: Wilbur B. Crawford, Ann Arbor; Earl W. Young, Detroit; Raymond Happy, Wayne, all of Mich.

[73] Assignee: General Motors Corporation, Detroit, Mich.

[22] Filed: June 19, 1973

[21] Appl. No.: 371,496

[52] U.S. Cl. .................. 51/101 R, 82/19, 90/13.9, 408/54
[51] Int. Cl. ...... B24b 17/02, B24b 7/00, B24b 9/00
[58] Field of Search ............ 408/54; 51/100, 101 R; 90/13.9; 82/19

[56] References Cited
UNITED STATES PATENTS
3,663,188    5/1972    Hoglund .......................... 51/101 R
3,750,345    8/1973    Kolesar et al. .................... 51/101 R Primary Examiner—Othell M. Simpson
Attorney, Agent, or Firm—Ronald L. Phillips

[57] ABSTRACT

A surface forming machine has a master cam having a first cam surface which corresponds to the contour to be formed and is frictionally engaged by a driver wheel and also having both a second cam surface and a gear track which are parallel to the first cam surface with the gear track geared to drive a rotary control cam arrangement that controls a pair of cam guides that operate against the second cam surface to orient the cam relative to the driver wheel and thereby maintain a rotary tool axis in the plane normal to the tangent to the surface to be formed at the contact of the tool with the workpiece.

3 Claims, 3 Drawing Figures

CAM CONTROLLED SURFACE FORMING MACHINE

This invention relates to cam controlled surface forming machines and more particularly to a machine that maintains a rotary tool axis in the plane normal to the tangent to the surface to be formed at the contact of the tool with the workpiece.

In forming a surface on a workpiece with a rotary tool such as a grinding wheel, extremely accurate dimensional results are obtained when the feed rate is constant and the grinding wheel axis is maintained in the plane normal to the tangent to the surface being ground at the contact of the grinding wheel with the workpiece. There are, of course, no substantial problems in grinding or otherwise forming a planar surface or a curved surface of constant radius with such machine design requirements; however, when the surface has a changing radius, the machines for doing planar and constant radius work will not normally meet both such requirements for such a complex surface. One such complex curve surface where precision is required is found in the rotor housing of the presently commercial, mass produced rotary engine, this surface being cylindrical and having the contour of either a two-lobed epitrochoid or a curve parallel thereto. One example of a machine that was specifically designed to grind this rotor housing surface which is an internal continuous surface is found in U.S. Pat. No. 3,663,188.

The machine according to the present invention also meets such machine design requirements and is particularly suitable for mass production usage in grinding the inner cylindrical surface of the presently commercial rotary engine. The machine has a cylindrical grinding wheel driven at constant speed rotatably mounted on a frame and a master cam is mounted on the frame for movement in a plane normal to the grinding wheel axis. A fixture is provided for securing the workpiece to move with the master cam while feeding into the grinding wheel in line contact parallel to the grinding wheel axis. The master cam has a first cam surface that corresponds to the surface to be ground and is traced by a straight line moving parallel to the grinding wheel axis. A driver wheel is mounted on the frame for rotation about a stationary axis parallel to the grinding wheel axis and the first cam surface. The driver wheel is driven at constant speed and is operable to drivingly frictionally engage the first cam surface in line contact parallel to the driver wheel axis to move the master cam and connected workpiece in planes normal to the grinding wheel axis while the workpiece moves into the grinding wheel at a constant feed rate. The master cam also has a second cam surface and a gear track which are both parallel to the first cam surface. A pair of cam guides are mounted on the machine frame for movement in planes normal to the driver wheel axis and are controlled by a pair of rotary control cams which are driven from the gear track and operate against the second cam surface to orient the master cam while it is being driven by the driver wheel to maintain the grinding wheel axis in the plane normal to the tangent to the surface to be ground at the line of contact of the grinding wheel with the workpiece. It will, of course, be appreciated by those skilled in the art that this machine is also suitable to use tools other than grinding wheels, such as milling cutters, hones and the like to precision form surfaces of complex curvature.

An object of the present invention is to provide a new and improved cam controlled surface forming machine having a rotary tool that operates on a workpiece at a constant feed rate while tangency is maintained between the tool and workpiece.

Another object is to provide a cam controlled surface forming machine for forming a curved surface having a master cam that is connected to move a workpiece relative to the machine tool by operation of a driver wheel frictionally drivingly engaging one cam surface on the cam conforming to the surface to be formed and a pair of guides operating against a second cam surface parallel to the first with the cam guides controlled by separate rotary control cams geared to a gear track parallel to the cam surfaces to orient the cam to maintain the tool axis in a plane normal to the tangent to the surface to be formed at the contact of the tool with the workpiece.

Another object is to provide a cam controlled surface forming machine having a master cam which operates to move a workpiece relative to a constant speed rotary tool with a constant speed driver wheel frictionally drivingly engaging a first cam surface on the cam corresponding to the surface of the workpiece to be formed which is an internal cylindrical surface of complex curvature and a pair of guides which at one end engage a second cam surface on the cam parallel to the first cam surface and at the other end are engaged and controlled by a pair of rotary control cams geared to a gear track on the cam parallel to the cam surfaces to orient the cam to maintain the rotary tool axis in the plane normal to the tangent to the surface to be formed at the contact of the rotary tool with the workpiece while the workpiece is being fed into the rotary tool at a constant feed rate by the driver wheel.

These and other objects of the present invention will become more apparent from the following description and drawing in which.

Figure 1:
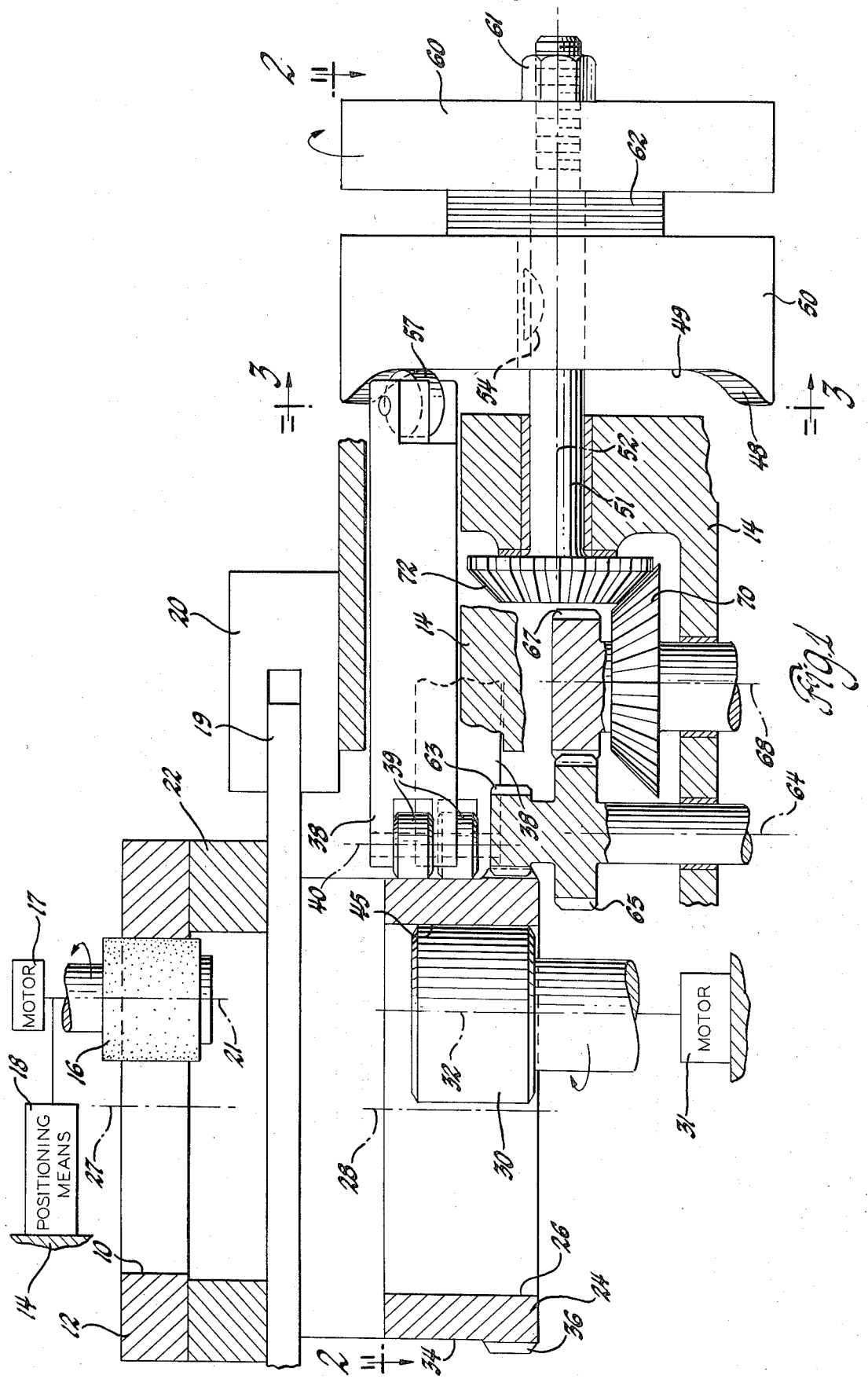
FIG. 1 is a partial elevational view with some parts shown in section and some parts shown diagramatically of a cam controlled surface forming machine according to the present invention.

Referring to FIG. 1, there is shown a cam controlled surface forming machine constructed according to the present invention that is particularly adapted to grind the internal surface 10 of a rotor housing 12 of a presently commercial rotary engine wherein the surface 10 is cylindrical and is to conform to a curve parallel to a two-lobed epitrochoid. The machine comprises a frame 14 on which is vertically mounted a cylindrical grinding wheel 16 that is driven by a constant speed motor 17 and may be moved both axially and radially by a suitable positioning mechanism 18 as described in more detail later. A horizontal floating table 19 is mounted beneath the grinding wheel 16 on the frame 14 by a hydrostatic bearing arrangement 20 of suitable type which receives the outer periphery of the table to permit table movement in a plane normal to the grinding wheel's axis 21 while preventing vertical table movement. A fixture 22 is provided for detachably securing the rotor housing workpiece 12 to the table 19 in a position to feed into the grinding wheel 16 in proper relationship to grind the surface 10.

Movement of the workpiece 12 relative to the grinding wheel 16 is effected by an annular master cam 24 which is secured to the underside of the floating table 19 and has an internal cylindrical cam surface 26 that corresponds in contour to the workpiece surface 10 to be ground, the fixture 22 securing the rotor housing workpiece 12 so that the center line 27 of surface 10 aligns with the center line 28 of the cam surface 26 and the workpiece is otherwise properly oriented relative to the cam. A cylindrical driver wheel 30 driven by a constant speed motor 31 is vertically mounted on the frame 14 with its axis 32 parallel to the cam surface 26 and the grinding wheel axis 21. The driver wheel 30 drivingly frictionally engages the cam surface 26 in line contact parallel to the driver wheel axis 32 to move or drive the cam 24 and connected rotor housing workpiece 12 in planes normal to the grinding wheel axis 21 and along paths corresponding to the surface to be formed on the workpiece. With the structure thus far described and assuming friction drive is maintained between the cam surface 26 and the constant speed driver wheel 30, the workpiece surface 10 will move relative to the surface of the constant speed grinding wheel 16 at a constant feed rate.

Figure 2:
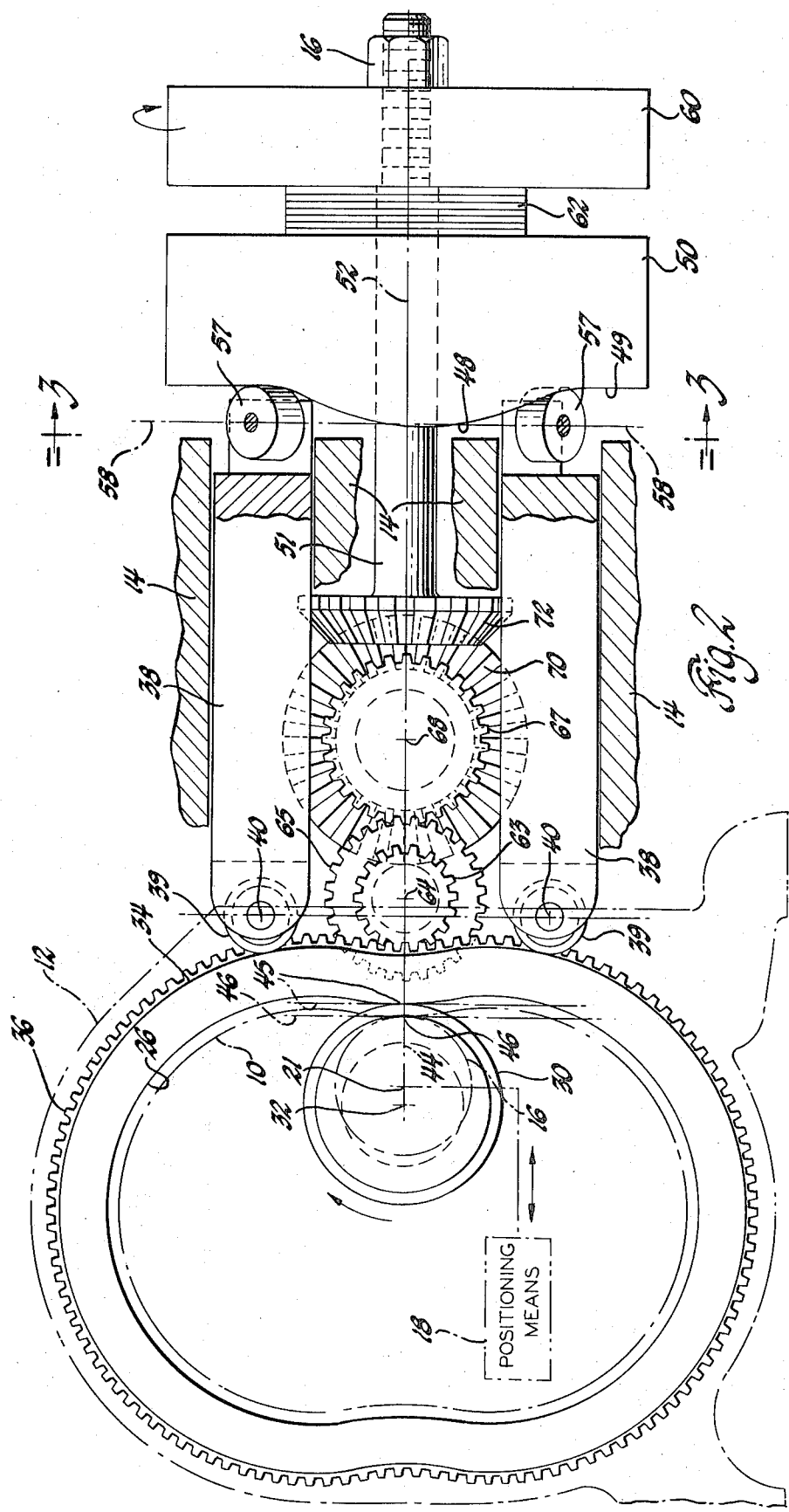
FIG. 2 is a view of the machine taken along the line 2—2 in FIG. 1.

According to the present invention there are provided machine elements to maintain the friction drive between the cam surface 26 and the driver wheel 30 and also to orient the cam 24 so that the grinding wheel axis 21 is maintained in the plane normal to the tangent to the workpiece surface 10 to be formed at the line of contact of the grinding wheel 16 with the workpiece that is, tangency is maintained between the grinding wheel surface and the surface to be ground. These machine elements include the cam 24 which further has an external cylindrical cam surface 34 and also an external endless driver gear track 36 that are both parallel to the internal cam surface 26 and extend completely about the cam 24 as best shown in FIG. 2. A pair of elongated, rectangularly shaped cam guides 38 are mounted on the frame 14 radially outward of the cam 24 for reciprocal movement in parallel directions as shown in FIG. 2 and in axially spaced parallel planes normal to the driver wheel axis 32 as shown in FIG. 1. Each of the cam guides 38 has a cylindrical ram follower roller 39 mounted thereon at one end thereof for rotation about an axis 40 parallel to the driver wheel axis 32 and external cam surface 34. The cam follower rollers 39 are arranged to engage and follow the cam surface 34 at different peripheral locations that are angularly spaced about and at equal distances from the driver wheel axis 32 as shown in FIG. 2. With this arrangement, the cam guides 38 are capable of forcing the rollers 39 against the outer cam surface 34 to thereby urge the inner cam surface 26 against the driver wheel 30 to maintain driving friction engage therebetween while also on reciprocal movement orienting the cam 24 and connected workpiece 12 so that the driver wheel axis 32 and the grinding wheel axis 21 are both in the plane 44 normal to the tangent 45 to the cam surface 26 at the line of contact of the driver wheel 30 with the cam surface 26 and also normal to the tangent 46 to the workpiece surface 10 to be ground at the line of contact of the grinding wheel 16 with the workpiece as shown in FIG. 2.

Figure 3:
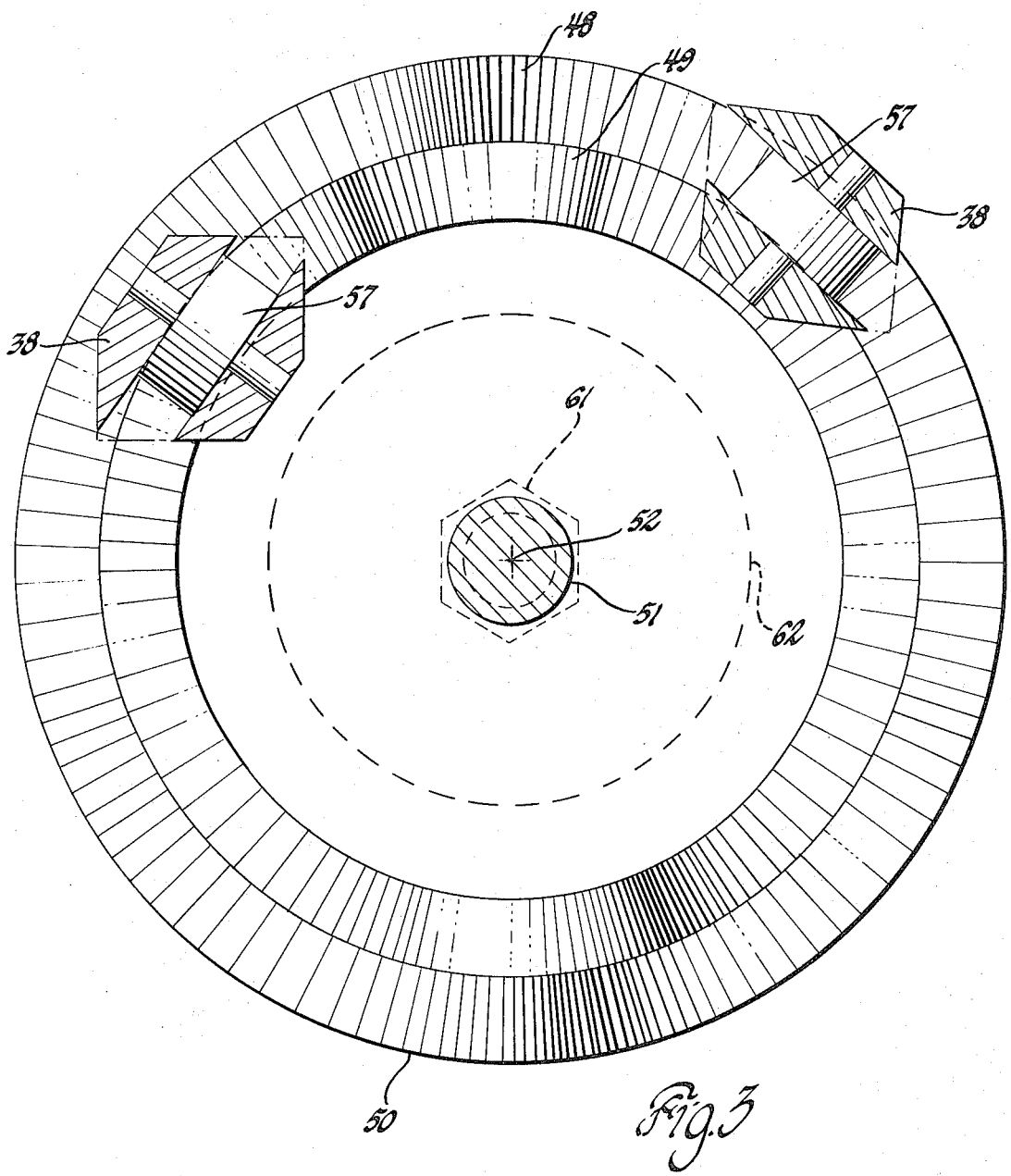
FIG. 3 is an enlarged view of the machine taken along the line 3—3 in FIG. 2.

To effect this orientation of the cam 24, the cam guides 38 are controlled by a pair of circular concentrically arranged rotary control cams 48 and 49 which are formed on a radial face of a rotary cam control member 50. The rotary cam member 50 is mounted on a spindle 51 that is journaled on the machine frame 14 with its axis 52 normal to the driver wheel axis 32 and in the plane 44 which bisects the included angle between rollers 39 where grinding wheel axis 32 is the center, there being provided a sliding slot and key coupling 54 between the rotary cam member 50 and the spindle 51 that prevents relative rotation and permits relative axial movement therebetween. The cam guides 38 rotatably support cylindrical cam follower rollers 57 at their other ends which roll against the different rotary cams 48 and 49 with the axis 58 of these rollers arranged to each be normal to the rotary cam member's axis 52 as shown in FIG. 3. A spring backing plate 60 is retained on the right end of the cam spindle 51 by a nut 61 and a plurality of Belleville springs 62 received about the spindle 51 are preloaded between the backing plate 60 and the rotary cam member 50 to urge axial movement of the latter to the left to bias the cams 48 and 49 against the cam follower rollers 57 and thereby acting through guides 38 bias the other cam follower rollers 39 against the outer cam surface 34 of cam 24 and the inner cam surface 26 thereof against the driver wheel 30. The rotary cam member 50 is synchronized to turn in phase with the cam 24 by a gear drive which comprises a spur gear 63 that meshes with the driver gear track 36 on cam 24 and is mounted for rotation on the frame 14 with its axis 64 parallel to the teeth of the gear track 36 and lying on the plane 44 which passes through the driver wheel axis 32 and the rotary cam member axis 52. A gear 65 integral with gear 63 meshes with an idler spur gear 67 which is also rotatably mounted on the frame 14 with its axis 68 parallel to the gear axis 64 and in the same plane 44. A bevel gear 70 integral with gear 67 meshes with a bevel gear 72 formed on the left end of the rotary cam spindle 51 to complete the gear train. The ratio of the gearing between the cam 24 and its rotary control cam member 50 is determined so that one complete turn of the rotary control cam member 50 corresponds to one complete turn of the cam 24 about the driver wheel axis 32. With this gear ratio thus set the profile of the cams 48 and 49 are determined according to the curve of the external cam surface 34 and thus of the surface to be formed so that as the driver wheel 30 is driving, the rotary cams 48 and 49 provide controlled reciprocal movement of the cam guides 38 to orient the cam 24 to positively maintain the grinding wheel axis 21 in the plane 44 normal to the tangent 46 to the surface to be formed at the line of contact of the grinding wheel 16 with the workpiece. As a result, the surface 10 is ground at a constant feed rate by the grinding wheel 16 while tangency is maintained between the grinding wheel surface and the surface being ground. Thus, with this arrangement, wear or replacement of the grinding wheel 16 will not effect the precision of the grind with adjustment for change in grinding wheel diameter be simply compensated for by adjustment of the grinding wheel axis 21 along the plane 44 normal to the workpiece surface by operation of the positioning mechanism 18.

In a typical operation of the machine, the grinding wheel 16 is raised by the positioning mechanism 18 and the workpiece 12 is secured in proper position on table 19 by the fixture 22. The grinding wheel 16 is then lowered free of the workpiece by the positioning mechanism 18 into the proper axial location. The driver wheel 30 is driven at constant speed by its motor 31 to drive the cam 24 and thus drive the workpiece 12 at a constant and proper feed rate relative to the grinding wheel 16 which is then being driven at constant speed by its motor 17. The cam guides 38 under the control of the rotary cam member 50 properly orient the cam 24 as previously described and the positioning mechanism 18 is then operated to radially advance the grinding wheel 16 into the workpiece 12 along the plane 44 to a prescribed depth to initiate grinding to the desired surface 10 all while the workpiece 12 is being moved relative thereto at constant speed. The surface of the workpiece is thus ground with the amount of grinding on each pass being controlled by the positioning mechanism 18 until the finish dimension is obtained. The positioning mechanism 18 is then operated to retract the grinding wheel 16 radially away from surface 10 and finally raised out of the workpiece to permit the latter's removal.

While the invention has been described above with respect to grinding an internal surface and particularly the internal peripheral surface of a rotary engine's rotor housing, it is to be understood that the machine of the present invention is also suited to operate other tools such as milling cutters, hones, forming tools and the like all with tool centering lines and to form external as well as internal curved surfaces with such tools. In the case of forming an external surface, it will be understood that the surfaces on the cam 24 would be reversed with the gear train, rotary cams and cam guides relocated to maintain the engagements described previously to provide proper orientation of the cam.

The above described embodiment is illustrative of the invention which may be modified within the scope of the appended claims.

We claim:

1. A machine for forming a curved surface on a workpiece comprising a statonary frame, a tool mounted on said frame relative to a tool centering line, a master cam mounted on said frame for movement in a plane normal to said tool centering line, a fixture for securing the workpiece to move with said master cam while feeding into said forming tool, said master cam having a first cam surface that corresponds to the surface to be formed and is traced by a line moving parallel to said tool centering line, a driver wheel mounted on said frame for rotation about an axis parallel to said tool centering line and said first cam surface, said driver wheel operable to drivingly frictionally engage said first cam surface to move said master cam and connected workpiece in planes normal to said tool centering line and along paths corresponding to the curved surface to be formed, said master cam also having a second cam surface and a gear track both parallel to said first cam surface, a pair of cam guide means mounted on said frame for reciprocal movement normal to said driver wheel axis, said cam guide means arranged to engage and follow said second cam surface at angularly spaced locations about said driver wheel axis and operable to urge said first cam surface against said driver wheel while on reciprocal movement orientating said master cam and connected workpiece so that said driver wheel axis and said tool centering line are in a plane normal to said first cam surface at the contact of said driver wheel with said first cam surface and also normal to the surface to be formed at the contact of said tool with the workpiece, a pair of rotary control cams supported on said frame for conjoint rotation about and movement along an axis normal to said driver wheel axis, said cam guide means also arranged to separately engage and follow said rotary control cams, bias means for biasing said rotary control cams against said cam guide means and said cam guide means against said second cam surface and said first cam surface against said driver wheel, gear means engaging said gear track on said master cam and drivingly connected to said rotary control cams so that said rotary control cams are turned as said master cam is moved about said driver wheel axis, and said rotary control cams having cam profiles determined according to the curve of the surface to be formed so that as said driver wheel is driving said master cam said rotary control cams provide controlled reciprocal movement of said cam guide means to orient said master cam to maintain said tool centering line in the plane normal to the surface to be formed at contact of said tool with the workpiece.

2. A machine for forming a curved surface on a workpiece comprising a stationary frame, a constant speed driven rotary tool mounted on said frame for rotation about an axis, positioning means for selectively moving said rotary tool axially and radially, a master cam rotated on said frame for movement in a plane normal to said rotary tool axis, a fixture for securing the workpiece to move with said master cam while feeding into said rotary tool, said master cam having a first cam surface that corresponds to the surface to be formed and is traced by a line moving parallel to said rotary tool axis, a constant speed driven driver wheel mounted on said frame for rotation about a fixed axis parallel to said rotary tool axis and said first cam surface, said driver wheel operable to drivingly frictionally engage said first cam surface in line contact parallel to said driver wheel axis to move said master cam and connected workpiece in planes normal to said rotary tool and along paths corresponding to the curved surface to be formed, said master cam also having a second cam surface and an endless gear track both parallel to said first cam surface, a pair of cam guide means mounted on said frame for reciprocal movement in parallel planes normal to said driver wheel axis, said cam guide means having first cam follower means arranged to engage and follow said second cam surface at angularly spaced locations about and at equal distances from said driver wheel axis and operable to urge said first cam surface against said driver wheel while on reciprocal movement orientating said master cam and connected workpiece so that said driver wheel axis and said rotary tool axis are in a plane normal to said first cam surface at the line of contact of said driver wheel with said first cam surface and also normal to the surface to be formed at the line of contact of said rotary tool with the workpiece, a pair of rotary control cams supported on said frame for conjoint rotation about and movement along an axis normal to said driver wheel axis, said cam guide means having second cam follower means arranged to separately engage and follow said rotary control cams, bias means for biasing said rotary control cams against said second cam follower means and said first cam follower means against said second cam surface and said first cam surface against said driver wheel, gear means engaging said gear track on said master cam and drivingly connected to said rotary cams so that said rotary control cams are turned in phase with said master cam as said master cam is moved about said driver wheel axis, and said rotary control cams having cam profiles determined according to the curve of the surface to be formed so that as said driver wheel is driving said master cam said rotary control cams turn in phase with said master cam and provide controlled reciprocal movement of said cam guide means to orient said master cam to maintain tangency between said rotary tool and the surface to be formed.

3. A machine for forming an internal curved surface on a workpiece traced by a straight line moving parallel to a fixed straight line comprising a stationary frame, a constant speed driven rotary tool mounted on said frame for rotation about an axis, positioning means for selectively moving said rotary tool axially and radially, an annular master cam mounted on said frame for movement in a plane normal to said rotary tool axis, a fixture for securing the workpiece to move with said master cam while feeding into line contact with said rotary tool, said master cam having an internal cam surface that corresponds to the surface to be formed and is traced by a straight line moving parallel to said rotary tool axis, a constant speed driven cylindrical driver wheel mounted on said frame for rotation about an axis parallel to said rotary tool axis and said internal cam surface, said driver wheel operable to drivingly frictionally engage said internal cam surface in line contact parallel to said driver wheel axis to move said master cam and connected workpiece in planes normal to said rotary tool and along paths corresponding to the surface to be formed, said master cam also having an external cam surface and an external endless gear track both parallel to said internal cam surface, a pair of cam guide means mounted on said frame for reciprocal movement in parallel planes normal to said driver wheel axis, said cam guide means having first cam follower rollers arranged to engage and follow said external cam surface at angularly spaced locations about and at equal distances from said driver wheel axis and operable to urge said internal cam surface against said driver wheel while on reciprocal movement orientating said master cam and connected workpiece so that said driver wheel axis and said rotary tool axis are in a plane normal to said internal cam surface at the line of contact of said driver wheel with said internal cam surface and also normal to the surface to be formed at the line of contact of said rotary tool with the workpiece, a pair of rotary control cams supported on said frame for conjoint rotation about an axis normal to said driver wheel axis, said cam guide means having second cam follower rollers arranged to separately engage and follow said rotary control cams, bias means for biasing said rotary control cams against said second cam follower rollers and said first cam follower rollers against said external cam surface and said internal cam surface against said driver wheel, gear means engaging said gear track on said master cam and drivingly connected to said rotary control cams so that said rotary control cams are turned in phase with said master cam as said master cam is moved about said driver wheel axis, and said rotary control cams having different cam profiles determined according to the curve of the surface to be formed so that as said driver wheel is driving said master cam said rotary control cams turn in phase with said master cam and provide controlled reciprocal movement of said cam guide means to orient said master cam to maintain said rotary tool axis in the plane normal to the surface to be formed at the line of contact of said rotary tool with the workpiece.

* * * * *